(12) United States Patent
Hatta et al.

(10) Patent No.: US 9,409,431 B2
(45) Date of Patent: Aug. 9, 2016

(54) RECORDING MEDIUM AND METHOD FOR MANUFACTURING RECORDING MEDIUM

(71) Applicant: CANON KABUSHIKI KAISHA, Tokyo (JP)

(72) Inventors: Naoya Hatta, Kawasaki (JP); Ryo Taguri, Sagamihara (JP); Olivia Herlambang, Kawasaki (JP); Hisao Kamo, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/519,501

(22) Filed: Oct. 21, 2014

(65) Prior Publication Data

US 2015/0110979 A1 Apr. 23, 2015

(30) Foreign Application Priority Data

Oct. 23, 2013 (JP) ................................ 2013-220411

(51) Int. Cl.
| B41M 5/00 | (2006.01) |
| B41M 5/52 | (2006.01) |
| B41M 5/50 | (2006.01) |
| C04B 41/00 | (2006.01) |
| C04B 41/45 | (2006.01) |
| C04B 41/50 | (2006.01) |
| C04B 41/52 | (2006.01) |

(52) U.S. Cl.
CPC ............. B41M 5/5218 (2013.01); B41M 5/506 (2013.01); B41M 5/508 (2013.01); B41M 5/5227 (2013.01); B41M 5/5254 (2013.01); C04B 41/009 (2013.01); C04B 41/45 (2013.01); C04B 41/5031 (2013.01); C04B 41/5036 (2013.01); C04B 41/52 (2013.01); B41M 2205/42 (2013.01)

(58) Field of Classification Search
CPC ...... B41M 5/506; B41M 5/08; B41M 5/5218; C04B 41/009; C04B 41/45; C04B 41/5031; C04B 41/5036; C04B 41/52
USPC .......... 428/32.24, 32.25, 32.28, 32.33, 32.34; 427/243
See application file for complete search history.

(56) References Cited

U.S. PATENT DOCUMENTS

| 2002/0108703 | A1* | 8/2002 | Romano et al. ............... 156/240 |
| 2003/0072925 | A1* | 4/2003 | Kiyama et al. ................ 428/195 |
| 2003/0189628 | A1 | 10/2003 | Kaga |
| 2005/0074601 | A1* | 4/2005 | Onishi ........................ 428/332 |
| 2008/0241436 | A1 | 10/2008 | Kobayashi |

FOREIGN PATENT DOCUMENTS

| CN | 1238202 C | 1/2006 |
| CN | 102632736 A | 8/2012 |
| EP | 2487045 A2 | 8/2012 |
| JP | 2013-226072 A | 11/2013 |

* cited by examiner

*Primary Examiner* — Betelhem Shewareged
(74) *Attorney, Agent, or Firm* — Canon U.S.A., Inc., IP Division

(57) ABSTRACT

A recording medium includes, in this order, a substrate, a first ink receiving layer containing inorganic particles, polyvinyl alcohol and a boric acid compound, and a resin layer containing a resin. In the first ink receiving layer, hydrated alumina accounts for 70% by mass or more of the inorganic particles. In the recording medium, the ratio of the boric acid compound content to the polyvinyl alcohol content is 30% by mass or more.

13 Claims, No Drawings

RECORDING MEDIUM AND METHOD FOR MANUFACTURING RECORDING MEDIUM

BACKGROUND OF THE INVENTION

1. Field of the Invention

The present application relates to a recording medium and a method for manufacturing the recording medium.

2. Description of the Related Art

For recording an image, a stack of recording media may be loaded into an image recording apparatus. In this case, when the recording media are conveyed one by one, adjacent media can rub each other and thus make scuff marks (hereinafter referred to as conveyance scuff marks in some cases) on each other. Japanese Patent Laid-Open No. 2013-226072 teaches that when the uppermost layer or ink receiving layer of a recording medium contains organic particles having an average particle size of 2 μm to 40 μm, conveyance scuff marks can be suppressed.

SUMMARY OF THE INVENTION

According to an aspect of the application, a recording medium is provided which includes, in this order, a substrate, a first ink receiving layer containing inorganic particles, polyvinyl alcohol and a boric acid compound, and a resin layer containing a resin. In the first ink receiving layer, the inorganic particles contain 70% by mass or more of hydrated alumina relative to the total mass thereof. In the recording medium, the ratio of the boric acid compound content to the polyvinyl alcohol content is 30% by mass or more.

According to another aspect of the application, a method for manufacturing a recording medium is provided which includes in this order Step (i) of forming a first coating layer by applying a first coating liquid containing inorganic particles, polyvinyl alcohol and a boric acid compound to a substrate, and drying the applied first coating liquid, Step (ii) of wetting the first coating layer by applying a second coating liquid containing a resin and a boric acid compound to the first coating layer, and Step (iii) of pressure-bonding a heated mirror-finished roll to the wet first coating layer. In the first coating liquid, the inorganic particles contain 70% by mass or more of hydrated alumina relative to the total mass thereof. In the recording medium, the ratio of the boric acid compound content to the polyvinyl alcohol content is 30% by mass or more.

Further features of the present invention will become apparent from the following description of exemplary embodiments.

DESCRIPTION OF THE EMBODIMENTS

The present inventors found through their studies that the recording medium disclosed in Japanese Patent Laid-Open No. 2013-226072 cannot sufficiently suppress the occurrence of conveyance scuff marks. Also, the recording medium does not have sufficient glossiness, and images formed on the recording medium do not exhibit satisfactory color developability.

Accordingly, aspects of the present application provide a glossy recording medium on which conveyance scuff marks are not easily made and which allows printed images to exhibit high color developability, and also provides a method for manufacturing the recording medium.

Aspects of the present application will be further described using exemplary embodiments.

Method for Manufacturing Recording Medium

A method for manufacturing a recording medium according to an embodiment includes, in this order, Step (i) of forming a first coating layer by applying a first coating liquid containing inorganic particles, polyvinyl alcohol and a boric acid compound to a substrate and drying the applied first coating liquid, Step (ii) of wetting the first coating layer by applying a second coating liquid containing a resin and a boric acid compound to the first coating layer, and Step (iii) of pressure-bonding a heated mirror-finished roll to the wet first coating layer. These steps will be described below.

Step (i)

In Step (i), a first coating layer is formed by applying a first coating liquid containing inorganic particles, polyvinyl alcohol and a boric acid compound to a substrate, and drying the applied coating liquid. In the present embodiment, it is very important to dry the first coating liquid that has been applied to the substrate. After the first coating layer has been formed once through a drying operation, the first coating layer is wet again by applying a second coating liquid to the first coating layer in Step (ii) described later, and then, the wet first coating layer is pressure-bonded to a heated mirror-finished roll in Step (iii). The recording medium thus produced can overcome the above-described disadvantages at a high level. The substrate and the first coating liquid will now be described.

Substrate

The substrate may comprise a base paper, or may include a base paper and a resin layer (base paper coated with a resin). In the present embodiment, a substrate composed of only a base paper is advantageously used.

The base paper is mainly made of wood pulp, and may optionally contain a synthetic pulp such as polypropylene, or a synthetic fiber such as nylon or polyester. Exemplary wood pulp include leaf bleached kraft pulp (LBKP), leaf bleached sulfite pulp (LBSP), needle bleached kraft pulp (NBKP), needle bleached sulfide pulp (NBSP), leaf dissolving pulp (LDP), needle dissolving pulp (NDP), leaf unbleached kraft pulp (LUKP), and needle unbleached kraft pulp (NUKP). These wood pulps may be used singly or in combination. LBKP, NBSP, LBSP, NDP and LDP, which contain short fiber components, are advantageous. Pure chemical pulp is also advantageous such as sulfate pulp or sulfite pulp. Pulps bleached to increase the whiteness are also advantageous. The base paper may further contain a sizing agent, a white pigment, a reinforcing agent, a fluorescent brightening agent, a moisturizing agent, a dispersant, a softening agent or the like, if necessary.

The base paper may have a thickness in the range of 50 μm to 200 μm, such as in the range of 90 μm to 180 μm. The thickness of the base paper mentioned herein may be determined by the following procedure. First, the recording medium is cut to expose a section with a microtome, and the section is observed by scanning electron microscopy. The thickness of the base paper is measured at arbitrarily selected 100 points or more, and the average of the measured thicknesses is defined as the thickness of the base paper. The thicknesses of other layers may also be determined in the same manner.

The density of the base paper specified in JIS P 8118 may be in the range of 0.6 g/cm$^3$ to 1.2 g/cm$^3$, such as in the range of 0.7 g/cm$^3$ to 1.2 g/cm$^3$.

First Coating Liquid

The first coating liquid contains inorganic particles, polyvinyl alcohol and a boric acid compound, and hydrated alumina accounts for 70% by mass or more of the inorganic particles. The first coating layer formed by the application of the first coating liquid in Step (i) will act as the first ink receiving layer described later. The constituents of the first coating liquid will be described below.

(1) Inorganic Particles

As described above, hydrated alumina accounts for 70% by mass or more of the inorganic particles contained in the first coating liquid (first ink receiving layer). According to one aspect, hydrated alumina accounts for 90% by mass or more of the inorganic particles.

(1-1) Hydrated Alumina

The hydrated alumina may be expressed by the following general formula (X): $Al_2O_{3-n}(OH)_{2n} \cdot mH_2O$ (n represents 0, 1, 2, or 3, m represents a number of 0 to 10, such as 0 to 5, and m and n are not simultaneously set to 0.) $mH_2O$ represents a desorbable aqueous phase that is often not involved in the formation of crystal lattices, and m is not necessarily integer. Also, m can be brought to 0 by heating the hydrated alumina.

The hydrated alumina can be produced in a known process. More specifically, the hydrated alumina can be produced by hydrolysis of aluminum alkoxide, by hydrolysis of sodium aluminate, or by adding an aqueous solution of aluminum sulfate or aluminum chloride to a sodium aluminate aqueous solution to neutralize the sodium aluminate solution.

The hydrated alumina may be amorphous or may have a crystal structure in the form of gibbsite or boehmite, depending on the temperature of heat treatment. The crystal structure of the hydrated alumina can be analyzed by X-ray diffraction. The hydrated alumina used in the present embodiment may be amorphous or in the form of boehmite. Examples of the hydrated alumina include hydrated alumina disclosed in Japanese Patent Laid-Open Nos. 7-232473, 8-132731, 9-66664 and 9-76628, and commercially available hydrated alumina such as Disperal series HP 14 and HP 18 (each produced by Sasol). These types of hydrated alumina may be used singly or in combination.

The specific surface area of the hydrated alumina particles, determined by the BET method, may be in the range of 100 $m^2/g$ to 200 $m^2/g$, such as 125 $m^2/g$ to 175 $m^2/g$. In the BET method, molecules or ions having a known size are adsorbed to the surfaces of a sample, and the specific surface area of the sample is calculated from the amount of adsorbed molecules or ions. In the present embodiment, the molecules or ions of nitrogen gas are adsorbed.

In an embodiment, the hydrated alumina may be in the form of dispersion dispersed with a dispersant, and such a dispersion of the hydrated alumina may be used in the coating liquid. Preferably, the hydrated alumina in a dispersion has an average secondary particle size in the range of 100 nm to 300 nm, such as in the range of 100 nm to 200 nm. The particle size of the hydrated alumina in a dispersion can be measured by dynamic light scattering.

The hydrated alumina content in the first coating liquid may be in the range of 75% to 95% by mass.

The hydrated alumina may be dispersed with an acid. Such an acid may be a sulfonic acid expressed by the following general formula (Y): $R—SO^3H$.

In general formula (Y), R represents hydrogen, an alkyl group having a carbon number of 1 to 4, or an alkenyl group having a carbon number of 1 to 4, and R may be substituted with an oxo group, a halogen atom, an alkoxy group, or an acyl group. Such a sulfonic acid advantageously prevents bleeding in the printed image. Alkylsulfonic acids are particularly advantageous.

The ratio of the content of such an acid to the hydrated alumina content may be in the range of 1.3% to 2.8% by mass.

(1-2) Inorganic Particles Other than Hydrated Alumina

In the present embodiment, the first coating liquid may contain other inorganic particles than hydrated alumina. Examples of inorganic particles other than hydrated alumina include particles of alumina produced in a gas phase process, fumed silica, colloidal silica, titanium dioxide, zeolite, kaolin, talc, hydrotalcite, zinc oxide, zinc hydroxide, aluminum silicate, calcium silicate, magnesium silicate, zirconium oxide, and zirconium hydroxide. These inorganic particles may be used singly or in combination. It is advantageous to use alumina produced in a gas phase process, fumed silica or colloidal silica, particularly fumed silica, in combination with the above-described hydrated alumina. In this instance, the fumed silica content may be in the range of 5% to 10% by mass relative to the total mass of the inorganic particles.

(2) Polyvinyl Alcohol

In the present embodiment, the first coating liquid contains polyvinyl alcohol. The polyvinyl alcohol used in the present embodiment may be a polyvinyl alcohol or a polyvinyl alcohol derivative, such as cation-modified polyvinyl alcohol, anion-modified polyvinyl alcohol, silanol-modified polyvinyl alcohol, or polyvinyl acetal.

Polyvinyl alcohol can be synthesized by, for example, saponifying polyvinyl acetate. The saponification degree of the polyvinyl alcohol may be in the range of 80% to 100% by mole, such as in the range of 85% to 98% by mole. A saponification degree represents the proportion of the amount by mole of the hydroxy group produced by saponification reaction to the polyvinyl alcohol produced by saponifying a polyvinyl acetate. In the following description, a saponification degree refers to a value measured by the method specified in JIS K 6726. The average polymerization degree of the polyvinyl alcohol may be in the range of 1,500 to 5,000, such as in the range of 2,000 to 5,000. The average polymerization degree mentioned herein is the viscosity average polymerization degree measured by the method specified in JIS K 6726.

The polyvinyl alcohol content in the first coating liquid (first ink receiving layer) may be in the range of 7.0% to 13.0% by mass, such as in the range of 9.0% to 12.0% by mass. If it is less than 7.0% by mass, the strength of the ink receiving layer is reduced and conveyance scuff marks may not be sufficiently suppressed. In contrast, if it is higher than 13.0% by mass, pores of the in organic particles are filled with the polyvinyl alcohol, and consequently, the recording medium may not exhibit satisfactory ink absorbency.

(3) Boric Acid Compound

Boric acid compounds include orthoboric acid ($H_3BO_3$), metaboric acid (($HBO_2)_n$), and hypoboric acid ($H_4B_2O_4$). The boric acid compounds also include salts of boric acids. A boric acid compound in a salt form may be a water-soluble salt of any of the above-mentioned boric acids. Salts of the boric acids include alkali metal salts, such as sodium orthoborate and potassium orthoborate; alkaline-earth metal salts, such as magnesium orthoborate and calcium orthoborate; and ammonium salts. Among these compounds, orthoboric acid is advantageous from the viewpoint of the stability of the coating liquid with time and the effect of reducing the occurrence of cracks.

In the first coating liquid, the ratio of the boric acid compound content to the polyvinyl alcohol content may be 30% by mass or less. According to one aspect, it is in the range of 5% to 20% by mass.

(4) Other Additives

The first coating liquid may further contain other additives in addition to the above-described constituents. Examples of such additives include a pH adjuster, a thickener, a fluidity improving agent, an antifoaming agent, a foam suppressor, a surfactant, a release agent, a penetrant, a coloring pigment, a coloring dye, a fluorescent brightening agent, an ultraviolet absorbent, an antioxidant, a preservative, a fungicide, a water resistant additive, a dye fixing agent, a curing agent, and a weather-resistant material.

Step (ii)

In Step (ii), a second coating layer containing a resin and a boric acid compound is applied to the first coating layer formed in Step (i) to wet the first coating layer. The operation of Step (ii) enables the boric acid compound to diffuse into the first coating layer, thus helping the crosslinking reaction of the first coating layer to proceed. By diffusing the boric acid compound as above, the boric acid compound is uniformly fed to the first coating layer, so that crosslinking reaction occurs more uniformly than the case where the first coating layer itself contains a large amount of a boric acid compound. Thus, Step (ii) prevents degradation of color developability resulting from haze caused by local crosslinking reaction and degradation of glossiness resulting from degradation in surface uniformity. Also, if nonuniform crosslinking reaction has occurred, the resulting recording medium can be distorted by stress during being conveyed and thus damaged. However, since Step (ii) of the present embodiment enables the crosslinking reaction to proceed uniformly, the strength of the ink receiving layer can be kept and conveyance scuff marks can be suppressed.

In an embodiment, the operation of Step (ii) of applying the second coating liquid may be performed by immersing or dipping the substrate coated with the first coating liquid in the second coating liquid. The wet first coating layer refers to the first coating layer whose surface has absorbed a liquid component and is in a wet condition. The second coating liquid will now be described.

Second Coating Liquid

The second coating liquid contains a resin and a boric acid compound. The amount of the second coating liquid applied may be in the range of 0.1 g/m² to 0.3 g/m² in terms of solid content. The constituents of the second coating liquid will be described below.

(1) Resin

In the present embodiment, any known resins may be used in the second coating liquid. Examples of the resin include polyethylene, polypropylene, polyester, fluororesin, and silicone resin. Among these resins, polyethylene, particularly oxidized polyethylene, is advantageous.

Since the resin is used with a boric acid compound, which will act as a crosslinking agent, in the second coating liquid, it is desirable to select a resin that will not be crosslinked with the boric acid compound or that will not increase the viscosity of the coating liquid if it is crosslinked. For example, it is desirable that the resin has a small number of hydroxyl groups in the molecule because the boric acid compound will form a hydrogen bond with the hydroxyl group to initiate a crosslinking reaction. More specifically, the resin used in the second coating liquid may have a hydroxyl value of 50 mg/g or less.

In addition, it is advantageous that the resin is dispersed, that is, in the form of resin emulsion, in the second coating liquid. The use of a resin emulsion allows the resin coating of the resulting recording medium to have pores therein, thus enhancing the ink absorbency. The resin emulsion may have an average particle size in the range of 10 nm to 500 nm, such as in the range of 50 nm to 200 nm. Hence, it is advantageous that the second coating liquid contains a polyethylene emulsion.

According to one aspect, the resin has a melting point in the range of 90° C. to 130° C. Also, the glass transition temperature of the reins may be 0° C. or less. The resin having such thermal properties facilitates the transfer of the shape at the surface of a mirror-finished roll when the heated mirror-finished roll is pressure-bonded (casting) in the subsequent Step (iii), thus helping to produce glossy recording medium.

(2) Boric Acid Compound

Examples of the boric acid compound are the same as in (3) Boric Acid Compound in the description of the first coating liquid.

In the second coating liquid, the ratio of the boric acid compound content to the resin content may be 200% by mass or more. According to one aspect, it is in the range of 300% by mass to 500% by mass.

(3) Other Additives

The second coating liquid may further contain other additives as described in (4) Other Additives in the description of the first coating liquid, as long as advantageous effects are produced in the resulting recording medium. Furthermore, the second coating liquid may contain a pigment. On the other hand, it is advantageous that the second coating liquid contains no, or, if contains, at most 10% by mass or less of borax. Borax is likely to increase the viscosity of the second coating liquid, thus hindering the boric acid compound from dispersing into the first coating layer.

Step (iii)

In Step (iii), a heated mirror-finished roll is pressure-bonded to the wet first coating layer (casting step). By the operation of this step, the shape at the surface of the mirror-finished roll is transferred to the surface of the recording medium, thus imparting high glossiness to the recording medium. The mirror-finished roll may be heated to a temperature in the range of 90° C. to 130° C., such as 90° C. to 110° C. The arithmetic average surface roughness Ra specified in JIS B 0601:2001 of the mirror-finished roll may be 1.0 µm or less, such as 200 nm or less. Furthermore, it is particularly advantageous that a mirror-finished roll is selected which can give the resulting recording medium a surface having a specular glossiness of 35% or more at 20 degrees in accordance with JIS Z 8741.

Other Steps

The method of the present embodiment may further include other steps in addition to the above-described Steps (i) to (iii). For example, a third coating liquid containing fumed silica, polyvinyl alcohol and a boric acid compound may be applied to the surface of the substrate in Step (iv) before Step (i), or a fourth coating liquid may be applied in Step (v) before Step (iv). Also, a fifth coating liquid may be applied to the surface of the substrate opposite the ink receiving layer in Step (vi). In the present embodiment, the coating layer made of the third coating liquid corresponds to the second ink receiving layer described later, and the coating layer of the fourth coating liquid corresponds to the base coating layer described later. The coating layer of the fifth coating liquid corresponds to the back coating layer described alter. The third, fourth and fifth coating liquids will now be described.

Third Coating Liquid

The third coating liquid contains fumed silica, polyvinyl alcohol and a boric acid compound. The constituents of the third coating liquid will be described below.

(1) Fumed Silica

Fumed silica is produced by high temperature gas phase hydrolysis (flame hydrolysis) of a silicon halide, or a process (arc process) in which silica sand is heated with coke to be reduced and evaporated by arc in an electric furnace, followed by oxidizing the evaporated gas with air. The use of fumed silica increases ink absorbency and imparts transparency to the ink receiving layer because of the low refractive index thereof, consequently allowing the printed image to exhibit good color developability. Examples of the fumed silica include AEROSIL (produced by Nippon Aerosil) and Reolosil QS series (produced by Tokuyama).

The specific surface area of the fumed silica particles measured by the BET method may be in the range of 150 m²/g to 350 m²/g.

In the present embodiment, it is advantageous that the fumed silica is dispersed with a dispersant in the coating liquid. The fumed silica particles in such a dispersion may have an average secondary particle size in the range of 100 nm to 200 nm. The average secondary particle size of the fumed silica in a dispersion can be measured by dynamic light scattering.

The fumed silica may account for 90% by mass or more of the inorganic particles contained in the third coating liquid (second ink receiving layer).

(2) Polyvinyl Alcohol

The suitable saponification degree and viscosity average polymerization degree of the polyvinyl alcohol are the same as in (2) Polyvinyl Alcohol in the description of the first coating liquid.

The polyvinyl alcohol content in the third coating liquid (second ink receiving layer) may be in the range of 7.0% to 13.0% by mass, such as in the range of 9.0% to 12.0% by mass. If it is less than 7.0% by mass, the strength of the ink receiving layer is reduced and conveyance scuff marks may not be sufficiently suppressed. In contrast, if it is higher than 13.0% by mass, pores of the in organic particles are filled with the polyvinyl alcohol, and consequently, the recording medium may not exhibit satisfactory ink absorbency.

(3) Boric Acid Compound

Examples of the boric acid compound are the same as in (3) Boric Acid Compound in the description of the first coating liquid.

In the third coating liquid, the ratio of the boric acid compound content to the polyvinyl alcohol content may be 30% by mass or less. According to one aspect, it is in the range of 15% to 25% by mass.

(4) Other Additives

The third coating liquid may further contain other additives as described in (4) Other Additives in the description of the first coating liquid, as long as advantageous effects are produced in the resulting recording medium.

Fourth Coating Liquid

The fourth coating liquid may contain a pigment. The pigment in the fourth coating liquid may have a particle size of 1 μm or more and 100 μm or less.

The fourth coating liquid may contain a binder. Examples of the binder include starch derivatives, such as oxidized starch, etherified starch, and phosphoric acid-esterified starch; cellulose derivatives, such as carboxymethyl cellulose and hydroxyethyl cellulose; casein, gelatin, soy protein, polyvinyl alcohol, and derivatives thereof; conjugated polymer latexes, such as polyvinyl pyrrolidone, maleic anhydride resin, styrene-butadiene copolymer, and methyl methacrylate-butadiene copolymer; acrylic polymer latex, such as polymers of an acrylic ester and a methacrylic ester; vinyl polymer latexes, such as ethylene-vinyl acetate copolymer; functional group-modified polymer latexes of monomers having a functional group such as the carboxy group of the above polymers; products of cationization of the above-mentioned polymers with a cationic group; products of cationization at the surface of any of the above-cited polymers with a cationic surfactant; polymers of polymerization of any monomer of the above-cited polymers in the presence of a cationic polyvinyl alcohol, having surfaces at which the polyvinyl alcohol is distributed; polymers of polymerization of any monomer of the above-cited polymers in a cationic colloid particles-suspended dispersion, having surfaces at which cationic colloid particles are distributed; aqueous binders, such as melamine resin, urea resin, and other thermosetting synthesized resins; polymers and copolymers of methacrylic esters and acrylic esters, such as polymethyl methacrylate; and other synthetic resins such as polyurethane resin, unsaturated polyester resin, vinyl chloride-vinyl acetate copolymer, polyvinyl butyral, and alkyd resin. These binders may be used singly or in combination.

Fifth Coating Liquid

The fifth coating liquid may contain a pigment and a binder. The pigment and the binder used in the fifth coating liquid may or may not be the same as those used in the fourth coating layer. The pigment used in the fifth coating liquid may include particles having an aspect ratio of 5 or more.

Recording Medium

A recording medium according to an embodiment includes in this order a substrate, a first ink receiving layer containing inorganic particles, polyvinyl alcohol and a boric acid compound, and a resin layer containing a resin. In the first ink receiving layer, hydrated alumina accounts for 70% by mass or more of the total mass of the inorganic particles. In the recording medium, the ratio of the boric acid compound content to the polyvinyl alcohol content is 30% by mass or more. According to one aspect, the ratio of the boric acid compound content to the polyvinyl alcohol content is in the range of 35% to 60% by mass.

In the recording medium of the present embodiment, it is advantageous that the boric compound is uniformly dispersed in the ink receiving layer.

The recording medium of the present embodiment has a 20-degree specular glossiness, specified in JIS Z 8741, of 35% or more.

In the present embodiment, the recording medium may be suitable for use in ink jet recording.

First Ink Receiving Layer

In the present embodiment, the first ink receiving layer contains inorganic particles, polyvinyl alcohol and a boric acid compound, and hydrated alumina accounts for 70% by mass or more of the inorganic particles.

The first ink receiving layer may have a thickness in the range of 3 μm to 20 μm, such as in the range of 5 μm to 20 μm.

Second Ink Receiving Layer

The recording medium may further include a second ink receiving layer containing fumed silica and polyvinyl alcohol between the substrate and the first ink receiving layer.

The thickness of the second ink receiving layer may be 10 μm or less, such as in the range of 3 μm to 10 μm.

Base Coating Layer

The recording medium may further includes a base coating layer between the substrate and the first ink receiving layer or the second ink receiving layer. The presence of the base coating layer increases the ink absorbency, opacity and smoothness of the recording medium.

The base coating layer may have a thickness in the range of 5 μm to 40 μm, such as in the range of 10 μm to 30 μm.

Back Coating Layer

The recording medium may further include a back coating layer on the surface of the substrate opposite the ink receiving layer. The presence of the back coating layer enhances the suppression of conveyance scuff marks.

The thickness of the back coating layer may be in the range of 5 μm to 40 μm, such as in the range of 10 μm to 30 μm.

Resin Layer

The resin layer may have a thickness of 0.001 μm or more, such as in the range of 0.01 μm to 1.00 μm.

EXAMPLES

The application will be further described in detail with reference to Examples and Comparative Examples. However, the invention is not limited to the following Examples. In the following Examples, "part(s)" is on a mass basis unless otherwise specified.

Preparation of Recording Media

Preparation of Substrate

A paper stock was prepared by mixing 80 parts of LBKP having a Canadian standard freeness of 450 mL, 20 parts of NBKP having a Canadian standard freeness of 480 mL, 0.60 part of cationized starch, 10 parts of ground calcium carbonate, 15 parts of precipitated calcium carbonate, 0.10 part of alkylketene dimer, and 0.030 part of cationic polyacrylamide, and adding water to the mixture so as to have a solid content of 3.0% by mass. Subsequently, paper making using the paper stock was performed with a Fourdrinier machine, followed by three-step wet press and drying with a multicylinder dryer. Then, the resulting sheet was soaked with an aqueous solution of oxidized starch and dried so that the solid content after drying with a size press machine would be 1.0 g/m². The sheet was then finished by machine calendering to yield a 145 μm thick substrate having a basis weight of 170 g/m², a Stockigt sizing degree of 100 s, an air permeance of 50 s, a Bekk smoothness of 30 s, and a Gurley stiffness of 11.0 mN.

Preparation of Back Coating Liquid

A back coating liquid was prepared which contained calcium carbonate OPACARB A40 (produced by Specialty Minerals), flat kaolin Hydragloss 90 (produced by KaMin), styrene-butadiene latex CP692NA (produced by Dow), polyvinyl alcohol PVA 235 (produced by Kuraray), and glyoxal in a proportion of 50:50:6:5:1 on a solid mass basis.

Preparation of Base Coating Liquid

Base Coating Liquid 1

Base coating liquid 1 was prepared which contained calcium carbonate OPACARB A40 (produced by Specialty Minerals), wet process silica GASIL IJ624 (produced by PQ Corporation), and styrene-butadiene latex CP692NA (produced by Dow) in a proportion of 75:25:15 on a solid mass basis.

Base Coating Liquid 2

An aqueous solution of 5.0% by mass of borax was used as base coating liquid 2.

Base Coating Liquid 3

An aqueous solution of 5.0% by mass of boric acid was used as base coating liquid 3.

Preparation of Inorganic Particle Dispersion Liquid

Preparation of Hydrated Alumina Dispersion Liquid

To pure water was added 1.6 parts of methanesulfonic acid using a homogenizing mixer T.K. Homo Mixer MARK II model 2.5, manufactured by Primix). Subsequently, 100 parts of Disperal HP14 (produced by Sasol) having a BET specific surface area of 157 g/m² was slowly added as hydrated alumina with agitation at 3,000 rpm. Thus, a hydrated alumina dispersion liquid containing 23% by mass of solid was prepared. The solid content of the dispersion liquid was the value when the fluctuation of the mass reading, measured with an infrared moisture meter FD-620 (manufactured by Kett Electric Laboratory), of 5 g of the hydrated alumina dispersion liquid during being heated for 2 minutes at 120° C. came to less than 0.1%.

Preparation of Fumed Silica Dispersion Liquid

Into a suction disperser/mixer Conti-TDS were added pure water and 5.0 parts of dimethyldiallylammonium chloride homopolymer SHALLOL DC-902P (produced by Dai-ichi Kogyo Seiyaku) as a dispersant. Furthermore, 100 parts of AEROSIL 300 (produced by Nippon Aerosil), which is a fumed silica having a BET specific surface area of 300 g/m², was slowly added to the mixer rotated at the maximum speed. The materials were dispersed in each other for 24 hours to yield a fumed silica dispersion liquid containing 20% by mass of solid. The solid content of the dispersion liquid was measured in the same manner as in the case of the hydrated alumina dispersion liquid.

Preparation of Wet Process Silica Dispersion Liquid

GASIL IJ624 (produced by PQ Corporation) was added as wet process silica to pure water while being agitated at 3,000 rpm with a homogenizing mixer T.K. Homo Mixer MARK II model 2.5, manufactured by Primix) to yield a wet process silica dispersion liquid containing 10% by mass of solid. The solid content of the dispersion liquid was measured in the same manner as in the case of the hydrated alumina dispersion liquid.

Preparation of Upper Coating Liquid

The compositions of upper coating liquids are shown in Table 1. These were prepared as below.

Upper Coating Liquid 1

To the above-prepared hydrated alumina dispersion liquid was added the aqueous solution of 8% by mass of polyvinyl alcohol PVA 235 (average polymerization degree: 3,500, saponification degree: 88% by mole, produced by Kuraray) in terms of solid as a binder in an amount of 11 parts by mass relative to 100 parts of hydrated alumina (solid content). Subsequently, 1.0 part of the aqueous solution of 3% by mass of orthoboric acid in terms of solid boric acid was added, followed by mixing. Then, a surfactant Surfinol 465 (produced by Nissin Chemical Industry) was mixed in an amount of 0.1 part relative to the total mass of the coating liquid to yield upper coating liquid 1.

Upper Coating Liquid 2

The above-prepared hydrated alumina dispersion liquid and fumed silica dispersion liquid were mixed in a hydrated alumina-to-fumed silica mass ratio of 95:5, and an aqueous solution of 8% by mass of polyvinyl alcohol PVA 235 (in terms of solid) was added to the mixture in a proportion of 11 parts relative to 100 parts in total of hydrated alumina and fumed silica. Subsequently, 1.0 part of the aqueous solution of 3% by mass of orthoboric acid in terms of solid boric acid was added and mixed to yield upper coating liquid 2.

Upper Coating Liquids 3 to 5 and 7 to 13

Upper coating liquids 3 to 5 and 7 to 13 were prepared in the same manner as upper coating liquid 2, except that the ratio of hydrated alumina to fumed silica and the boric acid compound content were varied as shown in Table 1.

Upper Coating Liquid 6

Upper coating liquid 6 was prepared in the same manner as upper coating liquid 5 except that the fumed silica dispersion liquid was replaced with a colloidal silica dispersion liquid SNOWTEX AK-L (produced by Nissan Chemical Industries).

TABLE 1

Preparation Conditions of Upper Coating Liquids

| | Inorganic particles | | | | Polyvinyl alcohol | Boric acid compound |
| | First inorganic particles | | Second inorganic particles | | | |
| Upper coating liquid No. | Material | Content (Part) | Material | Content (Part) | Content* (Part) | Content* (Part) |
| --- | --- | --- | --- | --- | --- | --- |
| Upper coating liquid 1 | Hydrated alumina | 100 | — | 0 | 11.0 | 1.0 |
| Upper coating liquid 2 | Hydrated alumina | 95 | Fumed silica | 5 | 11.0 | 1.0 |
| Upper coating liquid 3 | Hydrated alumina | 90 | Fumed silica | 10 | 11.0 | 1.0 |
| Upper coating liquid 4 | Hydrated alumina | 80 | Fumed silica | 20 | 11.0 | 1.0 |
| Upper coating liquid 5 | Hydrated alumina | 70 | Fumed silica | 30 | 11.0 | 1.0 |
| Upper coating liquid 6 | Hydrated alumina | 70 | Colloidal silica | 30 | 11.0 | 1.0 |
| Upper coating liquid 7 | Hydrated alumina | 95 | Fumed silica | 5 | 11.0 | 0.5 |
| Upper coating liquid 8 | Hydrated alumina | 95 | Fumed silica | 5 | 11.0 | 2.0 |
| Upper coating liquid 9 | Hydrated alumina | 95 | Fumed silica | 5 | 11.0 | 3.0 |
| Upper coating liquid 10 | Hydrated alumina | 100 | — | 0 | 11.0 | 1.5 |
| Upper coating liquid 11 | — | 0 | Fumed silica | 100 | 22.0 | 4.0 |
| Upper coating liquid 12 | Hydrated alumina | 65 | Fumed silica | 35 | 11.0 | 1.0 |
| Upper coating liquid 13 | Hydrated alumina | 100 | — | 0 | 11.0 | 4.0 |

Content*: relative to total solid (100 parts) of inorganic particles

Preparation of Lower Coating Liquid

The compositions of lower coating liquids are shown in Table 2. These were prepared as below.

Lower Coating Liquid 1

An aqueous solution of 8% by mass of polyvinyl alcohol PVA 235 (in terms of solid) was added to the above-prepared fumed silica dispersion liquid in a proportion of 22 parts by mass relative to 100 parts by mass of fumed silica. Subsequently, 4 parts by mass of the aqueous solution of 3% by mass of orthoboric acid was added in terms of solid boric acid and mixed to yield lower coating liquid 1.

Lower Coating Liquid 2

The above-prepared hydrated alumina dispersion liquid and fumed silica dispersion liquid were mixed in a hydrated alumina-to-fumed silica mass ratio of 10:90, and an aqueous solution of 8% by mass of polyvinyl alcohol PVA 235 (in terms of solid) was added to the mixture in a proportion of 22 parts by mass relative to 100 parts by mass in total of hydrated alumina and fumed silica. Subsequently, 4 parts by mass of the aqueous solution of 3% by mass of orthoboric acid was added in terms of solid boric acid and mixed to yield lower coating liquid 2.

Lower Coating Liquid 3

Lower coating liquid 3 was prepared in the same manner as lower coating liquid 2, except that the above-prepared hydrated alumina dispersion liquid and fumed silica dispersion liquid were mixed in a hydrated alumina-to-fumed silica mass ratio of 20:80.

Lower Coating Liquid 4

Lower coating liquid 4 was prepared in the same manner as lower coating liquid 2, except that the hydrated alumina dispersion liquid was replaced with the wet process silica dispersion liquid.

TABLE 2

Preparation Conditions of Lower Coating Liquids

| | Inorganic particles | | | | Polyvinyl alcohol | Boric acid compound |
| | First inorganic particles | | Second inorganic particles | | | |
| Lower coating liquid No. | Material | Content* (Part) | Material | Content (Part) | Content* (Part) | Content* (Part) |
| --- | --- | --- | --- | --- | --- | --- |
| Lower coating liquid 1 | — | 0 | Fumed silica | 100 | 22.0 | 4.0 |
| Lower coating liquid 2 | Hydrated alumina | 10 | Fumed silica | 90 | 22.0 | 4.0 |
| Lower coating liquid 3 | Hydrated alumina | 20 | Fumed silica | 80 | 22.0 | 4.0 |
| Lower coating liquid 4 | Wet process silica | 10 | Fumed silica | 90 | 22.0 | 4.0 |

Content*: relative to total solid (100 parts) of inorganic particles

Preparation of Casting Liquids

The compositions of the casting liquids are shown in Table 3. These were prepared as below.

Casting Liquid 1

A polyethylene emulsion Polylon L-787 (produced by Chukyo Yushi) was added to pure water so as to yield a solid content of 1% by mass, and the material was agitated at 400 rpm with Three-One Motor BL 1200 (manufactured by Shinto Scientific) to yield casting liquid 1.

Casting Liquid 2

A polyethylene emulsion Polylon L-787 (produced by Chukyo Yushi) in an amount of 1% by mass in terms of solid content and the aqueous solution of 5% by mass of orthoboric acid in an amount of 4% by mass in terms of solid content were added to pure water, and the materials were agitated at 400 rpm with Three-One Motor BL 1200 (manufactured by Shinto Scientific) to yield casting liquid 2.

Casting Liquids 3 to 7

Casting liquids 3 to 7 were prepared in the same manner as casting liquid 2 except that the boric acid content and polyethylene emulsion content in the casting liquid were set as shown in Table 3.

Casting Liquid 8

Casting liquid 8 was prepared in the same manner as casting liquid 2 except that the polyethylene emulsion was replaced with a polyester wax SELOSOL 524 (produced by Chukyo Yushi).

Casting Liquid 9

A polyethylene emulsion Polylon L-787 (produced by Chukyo Yushi) in an amount of 1% by mass in terms of solid content, the aqueous solution of 5% by mass of orthoboric acid in an amount of 2% by mass in terms of solid content, and the aqueous solution of 5% by mass of borax in an amount of 2% by mass in terms of solid content were added to pure water, and the materials were agitated at 400 rpm with Three-One Motor BL 1200 (manufactured by Shinto Scientific) to yield casting liquid 9.

TABLE 3

Preparation Conditions of Casting Liquids

| Casting liquid No. | Resin emulsion | | First crosslinking agent | | Second crosslinking agent | |
|---|---|---|---|---|---|---|
| | Material | Content (mass %) | Material | Content (mass %) | Material | Content (mass %) |
| Casting liquid 1 | Polyethylene | 1.0 | — | 0 | — | 0 |
| Casting liquid 2 | Polyethylene | 1.0 | Orthoboric acid | 4.0 | — | 0 |
| Casting liquid 3 | Polyethylene | 1.0 | Orthoboric acid | 2.0 | — | 0 |
| Casting liquid 4 | Polyethylene | 1.0 | Orthoboric acid | 3.0 | — | 0 |
| Casting liquid 5 | Polyethylene | 0.8 | Orthoboric acid | 4.0 | — | 0 |
| Casting liquid 6 | Polyethylene | 0.6 | Orthoboric acid | 4.0 | — | 0 |
| Casting liquid 7 | Polyethylene | 0.4 | Orthoboric acid | 4.0 | — | 0 |
| Casting liquid 8 | Polyester | 1.0 | Orthoboric acid | 4.0 | — | 0 |
| Casting liquid 9 | Polyethylene | 1.0 | Orthoboric acid | 2.0 | Borax | 2.0 |

Preparation of Recording Media

Recording media were prepared as below. Table 4 shows the coating liquids used for producing the recording media and the thicknesses of each layers. Table 4 also shows the calculated ratio of the boric acid compound content to the polyvinyl alcohol content in each of the resulting recording media.

Recording Medium 1

Base coating liquid 1 prepared above was applied to the surface of the substrate prepared above with a blade coater, and dried to yield a coating of 20 µm in thickness. Then, upper coating liquid 2 was applied to the coating with a curtain coater and dried with hot air to yield a coating of 20 µm in thickness. Subsequently, the back coating liquid was applied to the surface of the substrate opposite the surface coated with upper coating liquid 2 with a blade coater and was then dried to yield a coating of 20 µm in thickness. Casting liquid 1 was applied in an amount of 0.27 L/m² to the surface coated with the upper coating liquid 2 to wet the coating layer over the substrate, and a mirror-finished roll heated to 105° C. was pressure-bonded to the coating layer of the substrate to yield recording medium 1.

Recording Medium 2 to 30 and 35 to 37

Base coating liquid 1 prepared above was applied to the surface of the substrate prepared above with a blade coater, and dried to yield a coating of 20 µm in thickness. Then, the lower coating liquid and an upper coating liquid were applied in that order to the substrate with a curtain coater, followed by drying with hot air. Subsequently, a casting liquid was applied to wet the coating layer over the substrate, and a mirror-finished roll heated to 105° C. was pressure-bonded to the coating layer of the substrate to yield a recording medium. Table 4 shows the lower and upper coating liquids and the casting liquid used in this operation, the thicknesses of the upper layer, lower layer and casting layer, and the amount of the casting liquid applied. For recording medium 37, the upper coating layer was not formed because the viscosity of upper coating liquid 13 was too high.

Recording Medium 31

Recording medium 31 was prepared in the same manner as recording medium 2 except that base coating liquid 1 was replaced with base coating liquid 2, and that casting liquid 2 was replaced with casting liquid 1.

Recording Medium 32

Recording medium 32 was prepared in the same manner as recording medium 31 except that base coating liquid 2 was replaced with base coating liquid 3.

Recording Medium 33

Base coating liquid 1 prepared above was applied to the surface of the substrate prepared above with a blade coater, and dried to yield a coating of 20 µm in thickness. Then, upper coating liquid 1 and lower coating liquid 1 were applied in that order to the coating of base coating liquid 1, and casting liquid 2 was applied to the wet coating layer without being dried. Furthermore, a mirror-finished roll heated to 105° C. was pressure-boned to the coating layer to yield recording medium 33. The thicknesses of the lower and upper layers and the casting layer and the amount of the casting liquid applied are shown in Table 4.

Recording Medium 34

Recording medium 34 was prepared in the same manner as recording medium 33 except that casting liquid 2 was replaced with casting liquid 9.

TABLE 4

Preparation conditions of Recording Media

| Recording medium No. | Upper coating liquid — Lower coating liquid No. | Upper coating liquid — Thickness (μm) | Lower coating liquid — Upper coating liquid No. | Lower coating liquid — Thickness (μm) | Casting liquid — Casting liquid No. | Casting liquid — Applied amount (L/m²) | Casting liquid — Thickness (μm) | Boric acid compound/ polyvinyl alcohol in recording medium (mass %) |
|---|---|---|---|---|---|---|---|---|
| Recording medium 1  | —                    | 0    | Upper coating liquid 2  | 20.0 | Casting liquid 2 | 0.27 | 0.20 | 49.8 |
| Recording medium 2  | Lower coating liquid 1 | 5.0  | Upper coating liquid 1  | 15.0 | Casting liquid 2 | 0.27 | 0.20 | 46.6 |
| Recording medium 3  | Lower coating liquid 1 | 5.0  | Upper coating liquid 2  | 15.0 | Casting liquid 2 | 0.27 | 0.20 | 46.6 |
| Recording medium 4  | Lower coating liquid 1 | 5.0  | Upper coating liquid 3  | 15.0 | Casting liquid 2 | 0.27 | 0.20 | 46.6 |
| Recording medium 5  | Lower coating liquid 1 | 5.0  | Upper coating liquid 4  | 15.0 | Casting liquid 2 | 0.27 | 0.20 | 46.6 |
| Recording medium 6  | Lower coating liquid 1 | 5.0  | Upper coating liquid 5  | 15.0 | Casting liquid 2 | 0.27 | 0.20 | 46.6 |
| Recording medium 7  | Lower coating liquid 1 | 5.0  | Upper coating liquid 6  | 15.0 | Casting liquid 2 | 0.27 | 0.20 | 46.6 |
| Recording medium 8  | Lower coating liquid 1 | 5.0  | Upper coating liquid 7  | 15.0 | Casting liquid 2 | 0.27 | 0.20 | 43.6 |
| Recording medium 9  | Lower coating liquid 1 | 5.0  | Upper coating liquid 8  | 15.0 | Casting liquid 2 | 0.27 | 0.20 | 52.5 |
| Recording medium 10 | Lower coating liquid 1 | 5.0  | Upper coating liquid 9  | 15.0 | Casting liquid 2 | 0.27 | 0.20 | 52.5 |
| Recording medium 11 | Lower coating liquid 1 | 5.0  | Upper coating liquid 10 | 15.0 | Casting liquid 2 | 0.27 | 0.20 | 58.3 |
| Recording medium 12 | Lower coating liquid 1 | 5.0  | Upper coating liquid 11 | 15.0 | Casting liquid 3 | 0.27 | 0.20 | 32.4 |
| Recording medium 13 | Lower coating liquid 1 | 5.0  | Upper coating liquid 2  | 3.0  | Casting liquid 3 | 0.27 | 0.20 | 50.1 |
| Recording medium 14 | Lower coating liquid 1 | 5.0  | Upper coating liquid 2  | 5.0  | Casting liquid 3 | 0.27 | 0.20 | 44.2 |
| Recording medium 15 | Lower coating liquid 1 | 5.0  | Upper coating liquid 2  | 10.0 | Casting liquid 4 | 0.27 | 0.20 | 45.7 |
| Recording medium 16 | Lower coating liquid 1 | 5.0  | Upper coating liquid 2  | 15.0 | Casting liquid 5 | 0.27 | 0.16 | 46.6 |
| Recording medium 17 | Lower coating liquid 2 | 5.0  | Upper coating liquid 2  | 15.0 | Casting liquid 6 | 0.27 | 0.12 | 46.6 |
| Recording medium 18 | Lower coating liquid 3 | 5.0  | Upper coating liquid 2  | 15.0 | Casting liquid 7 | 0.27 | 0.08 | 46.6 |
| Recording medium 19 | Lower coating liquid 1 | 5.0  | Upper coating liquid 2  | 15.0 | Casting liquid 2 | 0.27 | 0.20 | 46.6 |
| Recording medium 20 | Lower coating liquid 1 | 5.0  | Upper coating liquid 2  | 15.0 | Casting liquid 2 | 0.27 | 0.20 | 47.4 |
| Recording medium 21 | Lower coating liquid 1 | 5.0  | Upper coating liquid 2  | 15.0 | Casting liquid 2 | 0.27 | 0.20 | 46.6 |
| Recording medium 22 | Lower coating liquid 1 | 5.0  | Upper coating liquid 2  | 20.0 | Casting liquid 2 | 0.27 | 0.20 | 40.1 |
| Recording medium 23 | Lower coating liquid 1 | 5.0  | Upper coating liquid 2  | 10.0 | Casting liquid 2 | 0.27 | 0.20 | 56.5 |
| Recording medium 24 | Lower coating liquid 1 | 10.0 | Upper coating liquid 2  | 15.0 | Casting liquid 2 | 0.27 | 0.20 | 38.9 |
| Recording medium 25 | Lower coating liquid 1 | 5.0  | Upper coating liquid 2  | 15.0 | Casting liquid 8 | 0.27 | 0.20 | 46.6 |
| Recording medium 26 | Lower coating liquid 1 | 20.0 | Upper coating liquid 2  | 5.0  | Casting liquid 2 | 0.27 | 0.20 | 37.1 |
| Recording medium 27 | Lower coating liquid 1 | 5.0  | Upper coating liquid 2  | 15.0 | Casting liquid 2 | 0.46 | 0.34 | 46.6 |
| Recording medium 28 | —                    | 0    | Upper coating liquid 11 | 20.0 | Casting liquid 2 | 0.27 | 0.20 | 41.1 |
| Recording medium 29 | Lower coating liquid 1 | 5.0  | Upper coating liquid 12 | 15.0 | Casting liquid 2 | 0.27 | 0.20 | 46.6 |
| Recording medium 30 | Lower coating liquid 1 | 5.0  | Upper coating liquid 2  | 15.0 | Casting liquid 3 | 0.27 | 0.20 | 29.5 |
| Recording medium 31 | Lower coating liquid 1 | 5.0  | Upper coating liquid 2  | 15.0 | Casting liquid 1 | 0.27 | 0.20 | 46.6 |
| Recording medium 32 | Lower coating liquid 1 | 5.0  | Upper coating liquid 2  | 15.0 | Casting liquid 1 | 0.27 | 0.20 | 46.6 |
| Recording medium 33 | Lower coating liquid 1 | 5.0  | Upper coating liquid 2  | 15.0 | Casting liquid 2 | 0.27 | 0.20 | 46.6 |
| Recording medium 34 | Lower coating liquid 1 | 5.0  | Upper coating liquid 2  | 15.0 | Casting liquid 9 | 0.27 | 0.20 | 46.6 |
| Recording medium 35 | Lower coating liquid 1 | 5.0  | Upper coating liquid 2  | 15.0 | Casting liquid 3 | 0.27 | 0.20 | 21.0 |
| Recording medium 36 | Lower coating liquid 1 | 5.0  | Upper coating liquid 2  | 15.0 | Casting liquid 1 | 0.27 | 0.20 | 12.5 |
| Recording medium 37 | Lower coating liquid 1 | 5.0  | Upper coating liquid 13 | —    | Casting liquid 1 | 0.27 | 0.20 | — |

Recording Medium 38

Recording medium 38 was prepared in the same manner as recording medium 1 except that the back coating liquid was not applied.

Evaluations

In each evaluation, ratings A and B represent that the results were good, and rating C represents that the results were unacceptable. In evaluation, recording medium 33 was cracked at the surface thereof and was not be able to be evaluated.

Suppression of Conveyance Scuff Marks

Two sheets of each recording medium sample were loaded in an ink jet recording apparatus MG8230 (manufactured by Canon) in a state where the surfaces thereof coated with the coating liquid were overlaid on each other, and images were continuously printed on the two sheets at a duty of 100%. The image printed on the second sheet of the two sheets conveyed was visually observed to check whether there was a conveyance scuff mark at the surface of the sheet. The rating criteria were as follows, and the results are shown in Table 5:

A: Conveyance scuff marks were not observed.
B: Few scuff marks were observed, but were acceptable level.
C: Distinct scuff marks were observed.

Glossiness of Recording Media

The specular glossinesses of the recording media were measured at 20 degrees specified in JIS Z 8741 with a gloss meter VG2000 (manufactured by Nippon Denshoku Industries). Five random points on the surface were measured for each recording medium, and measurements were averaged. The rating criteria were as follows, and the results are shown in Table 5:

A: 20-degree specular glossiness was 40% or more.
B: 20-degree specular glossiness was 35% or more and less than 40%.
C: 20-degree specular glossiness was less than 35%.

Color Developability of Printed Image

An image of a black ink with a duty of 100% was printed on each recording medium using an ink jet recording apparatus MG8230 (manufactured by Canon), and the optical density of the image was measured with an optical reflection densitometer (manufactured by X-Rite). The rating criteria were as follows, and the results are shown in Table 5:

A: $2.1 \leq$ Optical density
B: $2.0 \leq$ optical density $< 2.1$
C: Optical density $< 2.0$

TABLE 5

Evaluation Results

| Example No. | Recording medium No. | Suppression of conveyance scuff marks | Glossiness of recording medium | Color developability of printed image |
|---|---|---|---|---|
| Example 1 | Recording medium 1 | B | A | A |
| Example 2 | Recording medium 2 | B | A | A |
| Example 3 | Recording medium 3 | A | A | A |
| Example 4 | Recording medium 4 | A | A | A |
| Example 5 | Recording medium 5 | A | A | B |
| Example 6 | Recording medium 6 | A | B | B |
| Example 7 | Recording medium 7 | A | A | B |
| Example 8 | Recording medium 8 | A | B | A |
| Example 9 | Recording medium 9 | A | A | A |
| Example 10 | Recording medium 10 | A | B | A |
| Example 11 | Recording medium 11 | A | B | B |
| Example 12 | Recording medium 12 | B | A | A |
| Example 13 | Recording medium 13 | A | A | B |
| Example 14 | Recording medium 14 | A | A | A |
| Example 15 | Recording medium 15 | A | A | A |
| Example 16 | Recording medium 16 | A | A | A |
| Example 17 | Recording medium 17 | B | A | A |
| Example 18 | Recording medium 18 | B | B | A |
| Example 19 | Recording medium 19 | A | A | A |
| Example 20 | Recording medium 20 | B | A | A |
| Example 21 | Recording medium 21 | B | B | A |
| Example 22 | Recording medium 22 | A | A | A |
| Example 23 | Recording medium 23 | A | A | B |
| Example 24 | Recording medium 24 | A | A | A |
| Example 25 | Recording medium 25 | B | A | B |
| Example 26 | Recording medium 26 | A | B | A |
| Example 27 | Recording medium 27 | A | B | A |
| Example 28 | Recording medium 38 | B | A | A |
| Comparative Example 1 | Recording medium 28 | A | C | B |
| Comparative Example 2 | Recording medium 29 | A | C | C |
| Comparative Example 3 | Recording medium 30 | C | A | A |
| Comparative Example 4 | Recording medium 31 | C | A | B |
| Comparative Example 5 | Recording medium 32 | C | A | B |
| Comparative Example 6 | Recording medium 33 | — | — | — |
| Comparative Example 7 | Recording medium 34 | A | A | C |
| Comparative Example 8 | Recording medium 35 | C | A | A |
| Comparative Example 9 | Recording medium 36 | C | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-220411 filed Oct. 23, 2013, which is hereby incorporated by reference herein in its entirety.

What is claimed is:

1. A recording medium comprising in this order:
   a substrate;
   a first ink receiving layer comprising inorganic particles, polyvinyl alcohol and a boric acid compound; and
   a resin layer containing a resin,
   wherein the inorganic particles comprise 70% by mass or more of alumina hydrate relative to the total mass thereof,
   wherein the ratio of the boric acid compound content in the recording medium to the polyvinyl alcohol content in the recording medium is 30% by mass or more, and
   wherein the resin of the resin layer comprises polyethylene.

2. The recording medium according to claim 1, further comprising a second ink receiving layer between the substrate and the first ink receiving layer, the second ink receiving layer comprising fumed silica, polyvinyl alcohol and a boric acid compound.

3. The recording medium according to claim 1, wherein the recording medium has a 20-degree specular glossiness of 35% or more when measured in accordance with JIS Z 8741.

4. A method for manufacturing a recording medium comprising a substrate, an ink receiving layer containing inorganic particles, a polyvinyl alcohol and a boric acid compound, and a resin layer containing a polyethylene, the method comprising in this order:
   Step (i) of forming a first coating layer by applying a first coating liquid containing the inorganic particles, the polyvinyl alcohol and the boric acid compound to the substrate and drying the applied first coating liquid;
   Step (ii) of wetting the first coating layer by applying a second coating liquid comprising the polyethylene and the boric acid compound to the first coating layer; and
   Step (iii) of pressure-bonding a heated mirror-finished roll to the wet first coating layer,
   wherein the inorganic particles comprise 70% by mass or more of alumina hydrate relative to the total mass thereof, and
   wherein the ratio of the boric acid compound content in the recording medium to the polyvinyl alcohol content in the recording medium is 30% by mass or more.

5. The method according to claim 4, further comprising Step (iv) of applying a third coating liquid containing fumed silica, polyvinyl alcohol and a boric acid compound before Step (i).

6. A recording medium produced by the method as set forth in claim 4.

7. The recording medium according to claim 1, wherein the substrate is composed of only a base paper.

8. The recording medium according to claim 1, wherein a thickness of the resin layer is 0.001 μm or more and 1.00 μm or less.

9. The recording medium according to claim 1, wherein a thickness of the resin layer is 0.01 μm or more and 1.00 μm or less.

10. The method according to claim 4, wherein in the first coating liquid, the ratio of the boric acid compound content to the polyvinyl alcohol content is 30% by mass or less.

11. The method according to claim 4, wherein in the first coating liquid, the ratio of the boric acid compound content to the polyvinyl alcohol content is 5% by mass or more and 20% by mass or less.

12. The method according to claim 4, wherein in the second coating liquid, the ratio of the boric acid compound content to the polyethylene content is 200% by mass or more.

13. The method according to claim 4, wherein in the second coating liquid, the ratio of the boric acid compound content to the polyethylene content is 300% by mass or more and 500% by mass or less.

* * * * *